Nov. 17, 1970                J. F. SCHULTZ                3,540,078
PRESSURE BALANCED ANNULAR EXTRUSION DIE
Filed Nov. 6, 1967                                    5 Sheets-Sheet 1

INVENTOR
John F. SCHULTZ

BY
ATTORNEY

INVENTOR
John F. SCHULTZ

BY *A. Robert Snyder*

ATTORNEY

INVENTOR
John F. SCHULTZ

BY
ATTORNEY

INVENTOR
John F. SCHULTZ

BY *A. Ralph Snyder*
ATTORNEY

United States Patent Office 3,540,078
Patented Nov. 17, 1970

3,540,078
PRESSURE BALANCED ANNULAR
EXTRUSION DIE
John F. Schultz, Whitby, Ontario, Canada, assignor, by mesne assignments, to E. I. du Pont de Nemours and Company, Wilmington, Del., a corporation of Delaware
Filed Nov. 6, 1967, Ser. No. 680,689
Int. Cl. B29f 3/00
U.S. Cl. 18—12                                       7 Claims

ABSTRACT OF THE DISCLOSURE

A circular rotating die, for extruding thermoplastic polymer, having a large feed passage within the inner lip section that distributes the polymer to the die lip extrusion area, whereby the forces within the structure are largely balanced.

---

This invention relates to a circular extrusion die having inner and outer lips adapted to rotate independently of each other.

Extrusion dies having lips adapted to rotate independently are not new. Usually such dies are operated so that the lips rotate in opposite direction to each other, although they may, of course, be rotated in the same direction at different speeds.

Such dies may be used to form tubular film and have the advantage of imparting a smearing action on the extruded molten plastic material to improve the surface properties of the film. However, difficulties have been encountered in the design and fabrication of large dies which are required to produce the large diameter tubular films demanded by today's market. The dies now employed to produce tubular film usually rotate but the lips are secured together with no relative rotational motion taking place between them.

Small diameter contra-rotating dies have found acceptance in the manufacture of extruded thermoplastic netting. The design and operation of such dies is discussed at length in Canadian Pat. 643,076, Frank B. Mercer, issued June 19, 1962. Even in the field of thermoplastic netting, there is a demand for larger diameter dies to produce the wider sheets of netting now required. It has been found difficult, however, to simply scale up existing designs to obtain these larger dies. Serious problems can be encountered with lip adjustments, bearing failures and non-uniform polymer distribution about the die circumference.

It is, therefore, an object of the present invention to overcome these difficulties.

A further object of this invention is to provide a large diameter circular extrusion die having independently rotating inner and outer lips.

Another object of the present invention is to provide means to balance the extremely large forces inside the die and reduce the stresses on the bearings.

These and other objects of the present invention will appear from the more detailed description set forth below, it being understood that such more detailed description is given by way of illustration since various changes therein may be made by those skilled in the art without departing from the scope or spirit of the present invention.

In connection with that more detailed description, FIG. 1 is a cross-sectional view of a typical small diameter die known in the prior art;

In accordance with the present invention, there is provided a method of extruding thermoplastic material into tubular form from a die having an inlet and an annular outlet, a relatively rigid die body, an inner lip section, and an outer lip section adapted to rotate relative to each other and relative to said die body, said method comprising feeding said thermoplastic material from a continuous pressure source to said inlet, conveying said thermoplastic material in a passage contained within said inner lip section from said inlet to an annular reservoir adjacent to said annular outlet, said reservoir having substantially the same diameter as said annular outlet, and withdrawing said thermoplastic material in tubular form from said annular outlet.

There is also provided a circular rotating die for the extrusion of thermoplastic materials comprising a relatively rigid die body, an inner lip sectioin, and an outer lip section adapted to rotate relative to each other and relative to said die body, an inlet and an annular outlet for said thermoplastic material, said annular outlet being formed by the space between said inner lip section and said outer lip section, a passage housed within said inner lip section adapted to convey said thermoplastic material from said inlet to an annular reservoir adjacent to and forming part of said annular outlet and having substantially the same diameter as said annular outlet.

Figure 1:
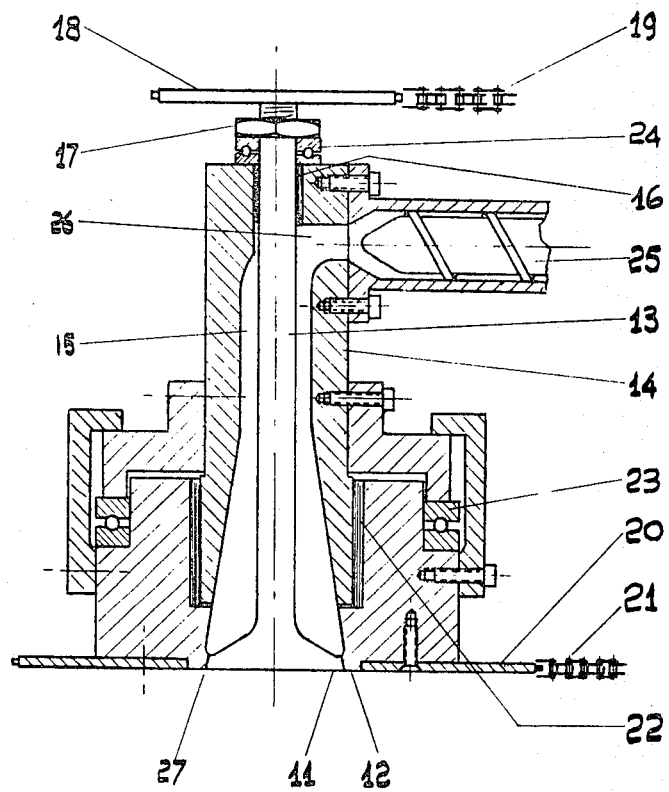

Referring now to the drawings, FIG. 1 illustrates an annular extrusion die of the prior art. There are several problems inherent in this design, and it is believed that a discussion of them will make for a better understanding of the present invention.

In the operation of the die illustrated in FIG. 1, thermoplastic material is fed by extruder screw 25 to the inlet 26 of the die body 14, and is conveyed down passage 15 towards outlet 27 between inner lip 11 and outer lip 12. Inner lip 11 is supported by a central shaft 13 which rotates on bearings 24 and is sealed by bushing 16. The outer lip 12 rotates on bearing 23 and is sealed by bushing 22. The inner lip is rotated by sprocket 18 and drive chain 19 and the outer lip by sprocket 20 and drive chain 21.

This presently-used die utilizes a long slender centre shaft to hold the inner die lip in place against the internal polymer pressure. Looking again at FIG. 1, the load on the centre shaft is a downward pull against thrust bearing 24 and the adjusting nut 17 on the top of the die head. The pressure of the polymer acts on the area of the die lip less the area of the shaft. In the case of a 4" die and having a 1" shaft and a 2,000 p.s.i. polymer pressure, the pull on the thrust bearing 24 is about 23,000 pounds. In the case of an 8" die with a 2" shaft and a 2,000 p.s.i. polymer pressure, the load is 100,000 pounds. A 16" die having a 4" shaft and a 2,000 p.s.i. polymer pressure would produce a load of 400,000 pounds.

Precise and stable adjustments become more difficult as the load is increased and at some point become rather impractical.

In the operation of such a die to produce netting, the lips must be in essential metal-to-metal contact to achieve a sharp cut-off between junctions. Various defects can be attributed to operation with the lips either too tight or too loose. In practice, the application of polymer pressure to the die lips causes the lips 11 and 12 to separate through an elongation of the centre shaft 13. This elongation may be compensated for and adjustments made to the adjusting nut 17 on top of the die head. Variations in polymer pressure through resin nonuniformity, temperature change, or extruder speed change cause a variation in the shaft elongation, and hence the lip-to-lip pressure. This can cause an off-standard product condition, or increase the wear rate on the lip faces. A loss of internal pressure through resin feed or equipment failure can cause rapid wear and can and does destroy the die lips.

Larger die sizes make the die lip adjustment more critical since the shaft load increases as the diameter squared, while the die lip seating area increases as the diameter. Larger dies require a higher degree of precision in die adjustment. By the same token, the lips become more sensitive to damage through excessive lip seating pressure caused by variations in internal polymer pressure.

In common with all side fed dies, the polymer distribution around the die lip circumference under non-rotating conditions is not uniform and approaches an imbalance of up to 50% in some cases. A polymer flow diverter may be provided but normally is not adequate for the job. Rotation of the die alleviates the problem and it does not appear at high rotating speeds. At low rotating speeds and in a wide sheet, some unit weight variation usually occurs. This also effects the uniformity of the mesh.

Figure 2:
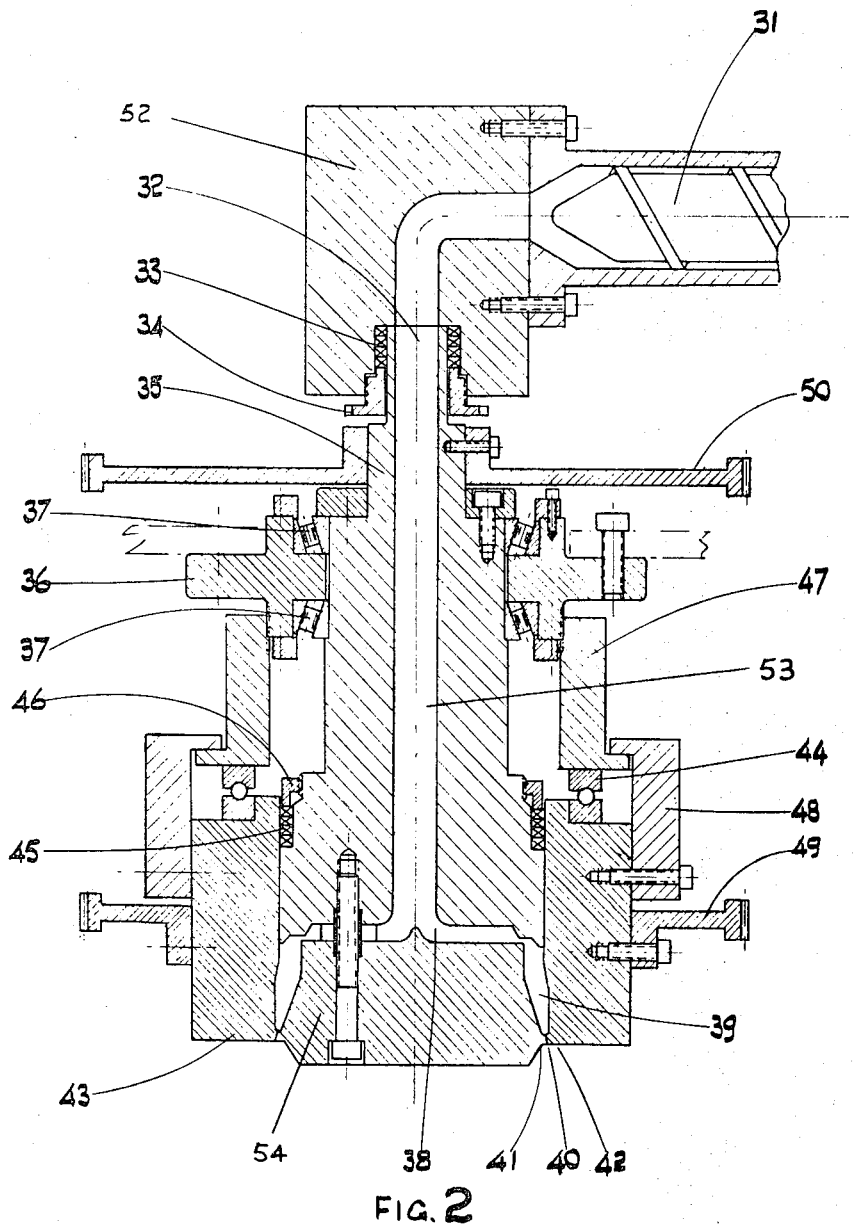
FIG. 2 is a cross-sectional view of a die having independently rotating lips, the inner and outer lip sections rotating on the die body, according to the present invention.

FIG. 2 illusrates the die of the present invention. Molten polymer is fed by the extruder screw 31 through the die adaptor 52 into the inlet 32 of the die. The polymer flows down the passage 53 contained within the inner lip section 35. The polymer is then laterally distributed in channel 38 to a reservoir 39 having approximately the same diameter as the outlet 40, between the inner lips 41 and the outer lips 42. In operation, the inner lip section 35 rotates on bearings 37 supported by the rigidly held die body 36. The inner lip section is driven by the inner lip drive sprocket 50. The rotating inner lip section is sealed against the die adaptor 52 by packing 33 and packing gland 34. The outer lip section 43 rotates on bearing 44 against the die body extension 47 and is driven by the outer lip drive sprocket 49. It is sealed against the inner lip section 35 by packing 45 and packing gland 46. A retainer 48 assists in keeping the outer lip section correctly positioned.

The major advance in this die concept lies in the manner in which the internal polymer pressures are inherently balanced and mechanically locked up between the inner die lip carrier 54 and the inner lip section 35. In this design 97% of the internal pressure is balanced leaving about 3% to insure that the outer lip section is seated against the thrust bearing 44. The inner die lip carrier 54 is bolted to the inner lip section 35 with preloaded high tensile bolts. The die is of sufficient robust construction that this small unbalanced force is not sufficient to cause elongation or distortion of any of the die parts. Adjustments made to the die lips at low output rates (60 lbs./hr.) have been found to be stable and satisfactory at high output rates (330 lbs./hr.).

Figure 4:
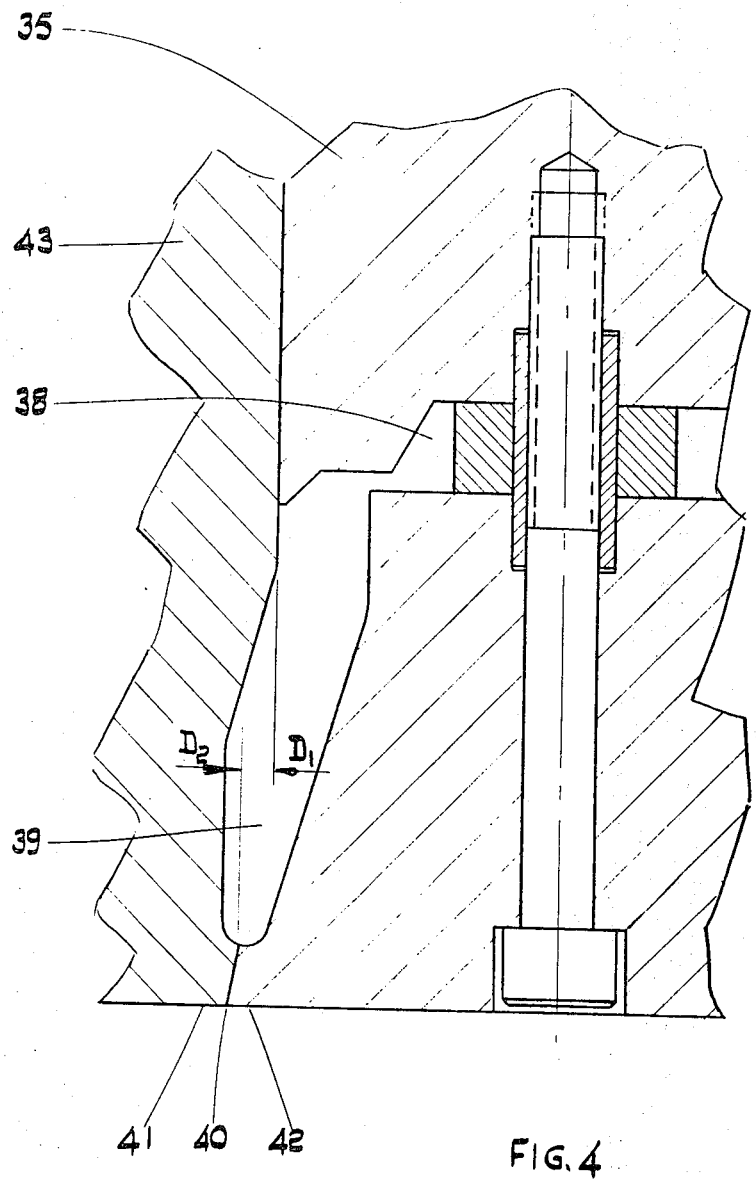
FIG. 4 is a detail of the lips of the dies illustrated in FIGS. 2 and 3.

The present design utilizes a small amount of the internal pressure to ensure seating of the outer body against the thrust bearing. This is illustrated in FIG. 4 in which D1 is the effective diameter of the contact line between the inner lip section and the outer lip section at the commencement of the reservoir and D2 is the nominal diameter of the annular outlet. The upward pressure on the outer lip section of the die is determined by the difference in diameters D1 and D2. This may be accomplished by other means such as heavy springs or some other device or a complete pressure balance may be obtained in the die itself by making D1 and D2 equal. If a downward thrust is desired this can be obtained by making D1 greater than D2.

The die is centre fed and the construction is symmetrical throughout. This ensures an even distribution of polymer around the circumference of the die lips under all conditions. The polymer passages are not subject to the counter-rotating shear effect of a conventional die except in the immediate area of the die lips. The polymer passages are large and the reduction of the polymer pressure is kept to a minimum.

Figure 3:
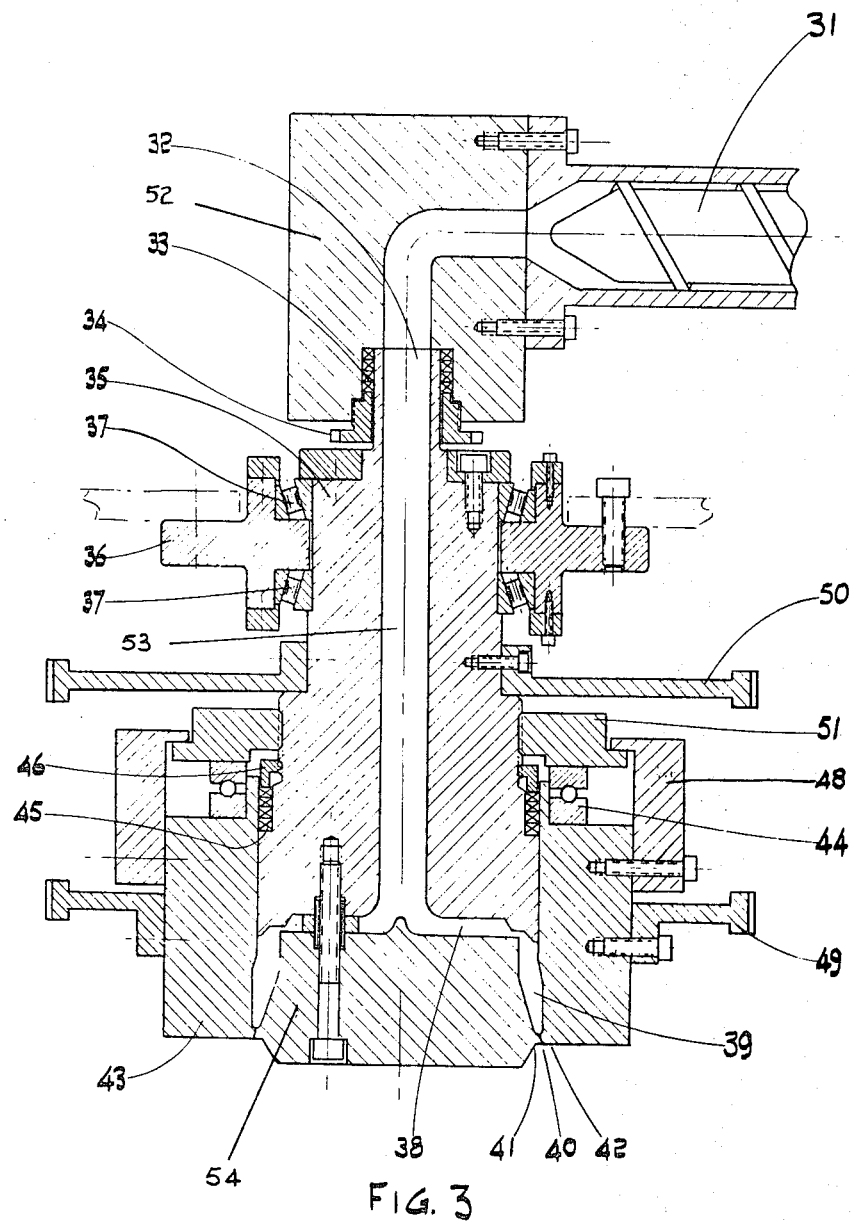
FIG. 3 is a cross-sectional view of an alternative form of die having independently rotating lips, the inner lip section rotating on the die body, and the outer lip section rotating on the inner lip section, according to the present invention.

A preferred embodiment of the invention is illustrated in FIG. 3. This die differs from the die shown in FIG. 2 in that the outer lip section 43 rotates on the inner lip section 35. The outer lip bearing 44 is held between the outer lip section 43 and bearing support 51 which is secured to and rotates with the inner lip section 35.

Figure 5A:
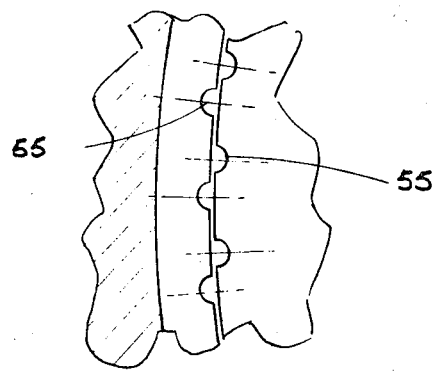
FIGS. 5a and 5b illustrate the die lips used to produce integrally-extruded thermoplastic netting.
Figure 5B:
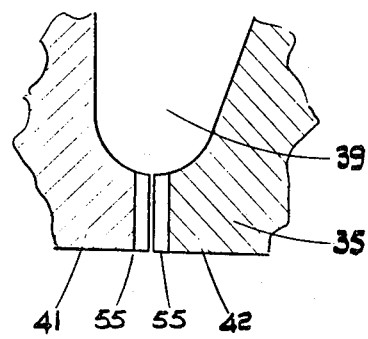
Figure 6A:
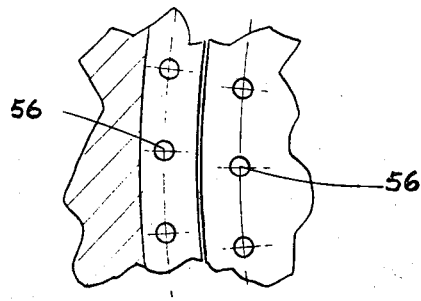
FIGS. 6a and 6b illustrate the die lips used to produce netting in which the junctions in the netting are produced exteriorly of the die lips.
Figure 6B:
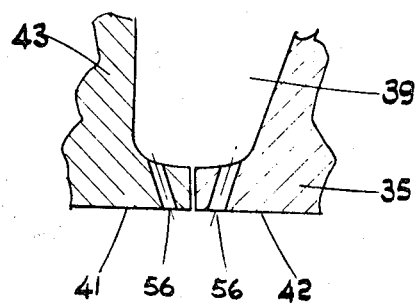

The die of the present invention may be used to form tubular film although the die is intended primarily for use in the production of thermoplastic netting. The lips of such a die are illustrated in FIGS. 5a, and b and 6a and b. FIGS. 5a and b show a die equipped with ducts or grooves 55 to produce a mesh in which the joining of the strands is effected within the die lips. FIGS. 6a and b show a die equipped with separate channels or holes 56. Such a die produces a net in which the joining of the strands is acommplished exteriorly of the die lips.

By the term "thermoplastic materials" as used herein, is meant:

(a) a synthetic organic thermoplastic polymer material capable of melt or compression extrusion in a molten state through dies and settable by a cooling medium on issuance from the dies. Suitable thermoplastic materials include polyamides or superpolyamides, such as nylon; polyesters; polyvinylchloride and copolymers thereof with vinylacetate or vinylidine chloride; polyolefins; polyethylene; copolymers of ethylene and the like; or (b) natural organic macromolecular materials such as cellulose chemically modified e.g. by esterification to render them thermoplastic, such as cellulose acetate;

(c) natural or synthetic rubbers, subsequently vulcanised or containing vulcanising agents; or (d) expandable or foamable thermoplastic materials such as expandable polystyrene or expandable polyethylene, subject to the above materials being safe and suitable for use in the method described herein.

The embodiments of the invention in which an exclusive property or privilege is claimed are defined as follows:

1. A circular rotating die for the extrusion of thermoplastic, polymeric organic materials comprising: a relatively rigid die body, an inner lip section and an outer lip section adapted to rotate relative to each other and relative to said die body, an inlet and an annular outlet for said thermoplastic material, said annular outlet being formed by the space between said inner lip section and said outer lip section, a passage housed within said inner lip section adapted to convey said thermoplastic material from said inlet to an annular reservoir adjacent to and forming part of said annular outlet and in which D1, the effective diameter with respect to the axis of the die of the contact line between the inner lip section and the outer lip section at the commencement of the reservoir, is substantially equal to D2, the nominal diameter of the annular outlet.

2. The die, as claimed in claim 1, in which said inner lip section and said outer lip section rotate on said rigid die body.

3. The die, as claimed in claim 1, in which said inner lip section rotates on said rigid die body and said outer lip section rotates on said inner lip section.

4. The die, as claimed in claim 1, in which the space between the die lips at the outlet is substantially constant to permit the extrusion of a tubular film.

5. The die, as claimed in claim 1, in which said lip sections at said outlet, each have a contacting surface, the surface of one lip section sliding on the surface of the other lip section, said surfaces extending in the direction of extrusion and having sets of cooperating complementary orifices adapted to feed said thermoplastic material and to permit the extrusion of a tubular netlike structure.

6. The die, as claimed in claim 5, in which said orifices are grooves in said contacting surfaces.

7. The die, as claimed in claim 5, in which said orifices are two coaxial sets of channels or holes, one of said sets being at a greater radius than the second of said sets.

References Cited

UNITED STATES PATENTS

| | | | |
|---|---|---|---|
| 2,714,744 | 8/1955 | Becker | 18—14 |
| 2,919,467 | 1/1960 | Mercer | 18—12 |
| 3,070,840 | 1/1963 | Mercer | 18—12 |
| 3,163,691 | 12/1964 | Anderson et al. | 264—167 |
| 3,234,071 | 2/1966 | Ward et al. | 156—441 |
| 3,281,897 | 11/1966 | Mercer. | |
| 3,384,692 | 5/1968 | Galt et al. | 264—167 |

FOREIGN PATENTS

| | | |
|---|---|---|
| 1,109,131 | 6/1961 | Germany. |
| 112,075 | 9/1962 | Pakistan. |

JULIUS FROME, Primary Examiner

J. H. WOO, Assistant Examiner

U.S. Cl. X.R.

18—14; 264—167, 176, 209